(12) United States Patent
Lee et al.

(10) Patent No.: US 12,129,889 B2
(45) Date of Patent: Oct. 29, 2024

(54) BALL SPLINE HAVING BYPASS TRACK

(71) Applicants: WON ST CO., LTD., Seoul (KR); WALMART APOLLO, LLC, Bentonville, AR (US)

(72) Inventors: Taek Won Lee, Seoul (KR); Hyeok Do Kwon, Seoul (KR); Gi Dong Son, Incheon (KR); Dong Hyup Nam, Siheung-si (KR); William J Fosnight, Windham, NH (US); Martin R Elliott, Bedford, NH (US)

(73) Assignees: WON ST CO., LTD., Seoul (KR); WALMART APOLLO, LLC, Bentonville, AR (US)

( * ) Notice: Subject to any disclaimer, the term of this patent is extended or adjusted under 35 U.S.C. 154(b) by 50 days.

(21) Appl. No.: 17/799,204

(22) PCT Filed: Feb. 21, 2020

(86) PCT No.: PCT/KR2020/002515
§ 371 (c)(1),
(2) Date: Aug. 11, 2022

(87) PCT Pub. No.: WO2021/167137
PCT Pub. Date: Aug. 26, 2021

(65) Prior Publication Data
US 2023/0160423 A1    May 25, 2023

(30) Foreign Application Priority Data

Feb. 17, 2020  (KR) .......................... 10-2020-0019065

(51) Int. Cl.
F16C 29/06    (2006.01)
(52) U.S. Cl.
CPC ............................... F16C 29/0695 (2013.01)

(58) Field of Classification Search
CPC .... F16C 3/035; F16C 29/068; F16C 29/0683; F16C 29/0685; F16C 29/0688;
(Continued)

(56) References Cited

U.S. PATENT DOCUMENTS

| | | | |
|---|---|---|---|
| 2,945,366 A | * | 7/1960 | Sears ...................... F16D 3/065 384/43 |
| 4,312,545 A | | 1/1982 | Blaurock et al. |

(Continued)

FOREIGN PATENT DOCUMENTS

| | | |
|---|---|---|
| JP | 2002-13529 A | 1/2002 |
| JP | 3184741 U | 7/2013 |

(Continued)

*Primary Examiner* — James Pilkington
(74) *Attorney, Agent, or Firm* — LRK PATENT LAW FIRM (57) ABSTRACT

A ball spline with detour tracks includes spline shaft, nut part movable along a longitudinal direction of the spline shaft, and balls between the nut part and the spline shaft, wherein the nut part includes nut adapted to insert the spline shaft thereinto and retainers on longitudinal sides of the nut, the spline shaft includes tracks extended along the longitudinal direction, the nut includes load track grooves formed in longitudinal direction on inner peripheral surface into which the spline shaft is inserted and non-load circulating portions formed in the longitudinal direction, each retainer includes circulating grooves on the inner peripheral surface to face the load track groove and non-load circulating portion, the balls run between the tracks and the load track grooves, and each track includes track groove formed in longitudinal direction of the spline shaft and detour tracks whose longitudinal sides are connected to the track groove.

13 Claims, 8 Drawing Sheets

(58) Field of Classification Search
CPC .......................... F16C 29/069; F16C 29/0692; F16C 29/0695; F16C 29/0697; F16D 3/065
See application file for complete search history.

(56) References Cited

U.S. PATENT DOCUMENTS

| | | | | | |
|---|---|---|---|---|---|
| 4,799,803 | A | * | 1/1989 | Tanaka | F16C 29/0695 384/49 |
| 4,936,692 | A | * | 6/1990 | Tanaka | F16C 29/0695 384/43 |
| 5,002,403 | A | * | 3/1991 | Hirose | F16C 29/0688 384/43 |
| 5,476,235 | A | * | 12/1995 | Di Gioia | B65H 75/20 242/608.8 |
| 7,637,662 | B2 | * | 12/2009 | Kato | F16C 29/0685 384/43 |
| 8,408,795 | B2 | * | 4/2013 | Ishihara | F16C 29/0695 384/43 |
| 2007/0110345 | A1 | | 5/2007 | Hsu et al. | |

FOREIGN PATENT DOCUMENTS

| | | |
|---|---|---|
| JP | 2016-094961 A | 5/2016 |
| KR | 10-0402592 B1 | 11/2003 |
| KR | 10-1393101 B1 | 5/2014 |
| WO | 2009/037931 A1 | 3/2009 |

\* cited by examiner

FIG. 1

Prior Art

BALL SPLINE HAVING BYPASS TRACK

CROSS-REFERENCE TO RELATED APPLICATIONS

The present application is a U.S. National Phase entry from International Application No. PCT/KR2020/002515, filed on Feb. 21, 2020, which claims priority to Korean Patent Application No. 10-2020-0019065, filed on Feb. 17, 2020, the disclosure of which is incorporated by reference herein in their entirety.

TECHNICAL FIELD

The present invention relates to a ball spline, and more particularly, to a ball spline with detour tracks that is capable of allowing a nut part to rotatingly move at a given angle with respect to a spline shaft at a given section thereof.

BACKGROUND ART

The ball spline is a type of linear motion bearing transmitting a linear motion accurately in the industrial fields of automobiles and semiconductors.

Figure 1:
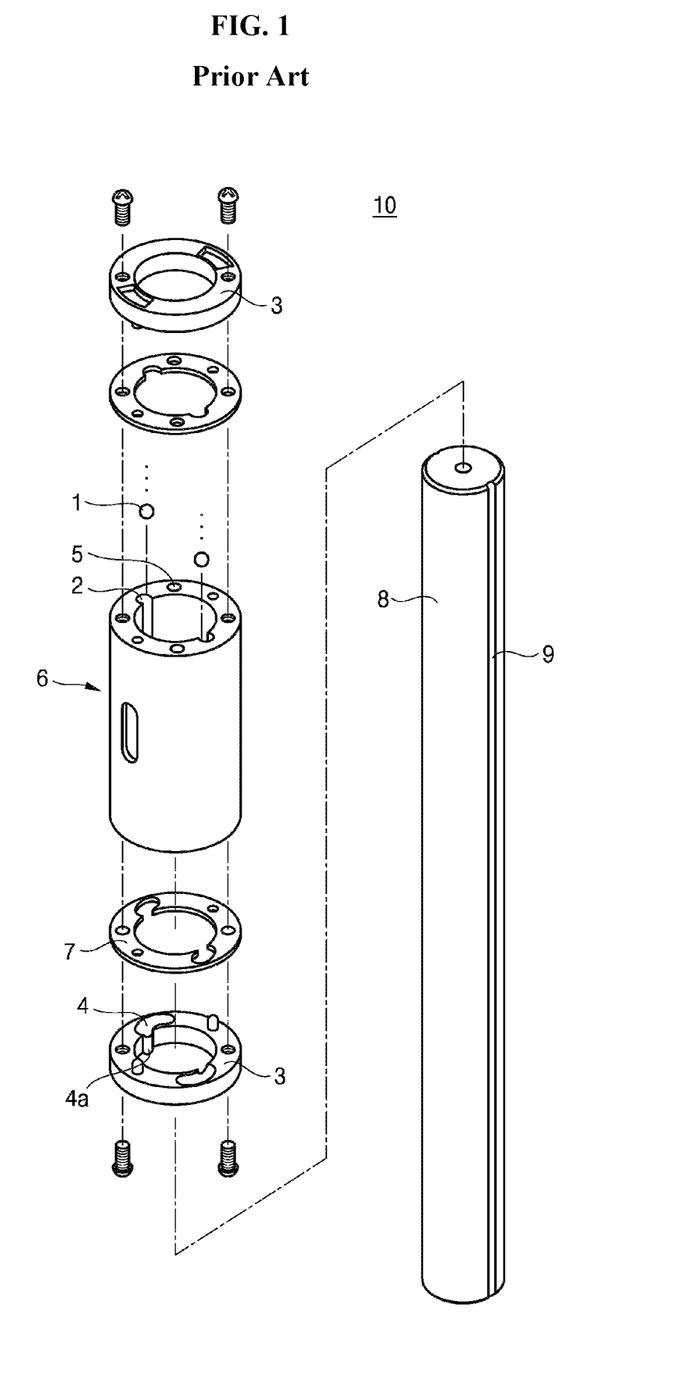
FIG. 1 is an exploded perspective view showing a conventional ball spline.

As shown in FIG. 1, a conventional ball spline 10 includes load track grooves 2 for accommodating balls 1 therein in such a manner as to expose one side surface of each ball 1 to the outside, so that the balls 1, which move along the load track grooves 2, enter non-load circulating holes 5 along circulating grooves 4 of retainers 3, and are thus circulated endlessly. The conventional ball spline 10 includes a nut 6 with the load track grooves 2 adapted to accommodate the balls 1 therein in such a manner as to each have an arch-shaped section with the radius of curvature greater than the radius of each ball 1, but each load track groove 2 is machined to form the same two arches on the left and right sides of the circular center axis thereof. As a result, the balls 1 are accommodated in the load track grooves 2 in such a manner as to come into contact with each load track groove 2 at the two contact points formed on the left and right sides of the circular center axis of each load track groove 2. If the balls 1 are accommodated in the load track grooves 2, the two contact points with which the balls 1 come into close contact become large with respect to the angles being open from the centers of the balls 1, thereby preventing the balls 1 from falling down into the load track grooves 2, and so as to allow the balls 1 to be gently circulated while the balls 1 are moving from the load track grooves 2 to the non-load circulating holes 5 along the circulating grooves 4 of the retainers 3, the load track grooves 2 have curved peripheries formed on the front end peripheries thereof. The balls 1 move along the curved end peripheries of the load track grooves 2, while moving, so that no impacts occur to thus prevent noise or vibrations from occurring.

In the case where a spline shaft 8 is inserted into the nut 6, the spline shaft 8 is configured to have a track groove 9 concavely extended in a longitudinal direction thereof in such a manner as to allow the balls 1 located protrudingly from the inner periphery of the nut 6 to be fitted thereto, and accordingly, the spline shaft 8 can perform forward and backward movements gently with respect to the nut 6 accurately by means of the balls 1. Through the circulation of the balls 1, the spline shaft 8 can perform the forward and backward movements, irrespective of its length.

The track groove 9 of the spline shaft 8 may have an arch-shaped section, but the track groove 9 is machined in the same manner as the load track grooves 2, so that the balls 1 move with 4-point contacts.

A reference numeral 7 in FIG. 1 represents a seal located between the nut 6 and each retainer 3, and a reference numeral 4a a circulating protrusion protruding inward from each retainer 3.

As shown in FIG. 1, the conventional ball spline 10 is configured to allow the nut 6 to which the retainers 3 are fastened to reciprocate along the spline shaft 8 in the longitudinal direction of the spline shaft 8, but in this case, the nut 6 cannot rotate with respect to the spline shaft 8.

Figure 2:
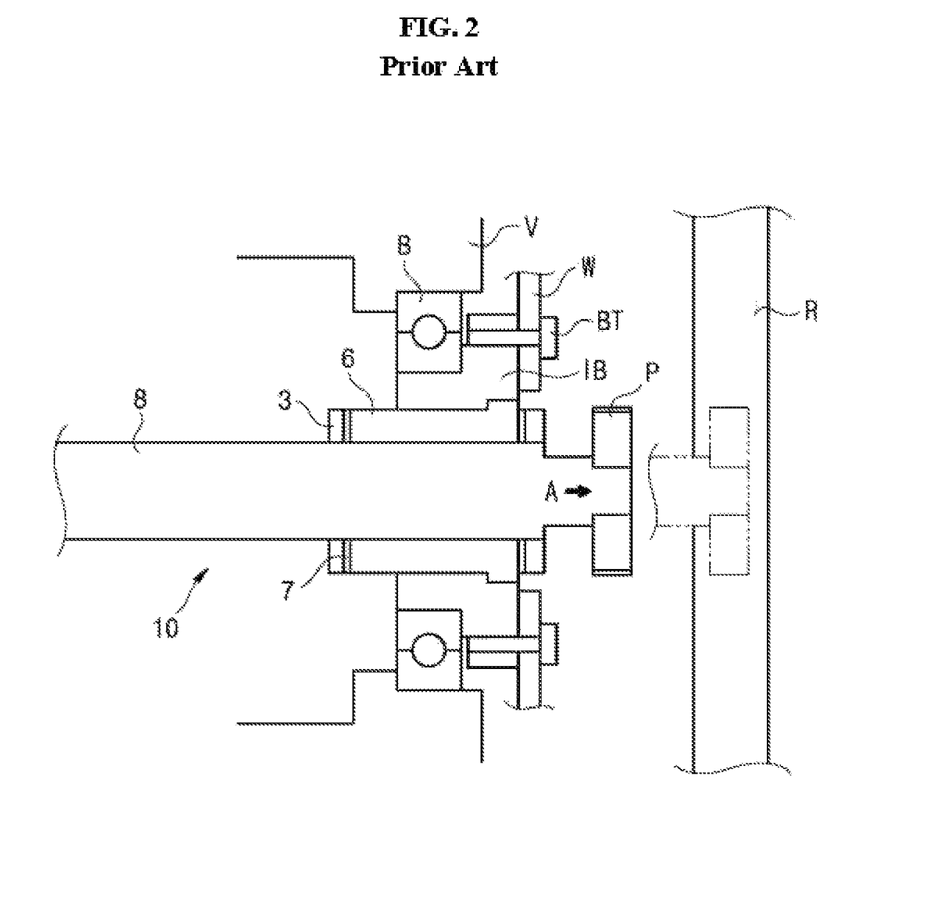
FIG. 2 is a partially front sectional view showing an application example of the conventional ball spline.

FIG. 2 is a schematic sectional view showing a moving means coupled to the conventional ball spline. FIG. 2 is shown to explain the application of the conventional ball spline.

As shown in FIG. 2, a moving means V has a bracket D3 as a hollow body with a circular section located on the outer periphery of the nut 6, a rolling bearing B located on the outer periphery of the bracket IB, and a wheel W mounted on the bracket IB in such a manner as to rotate unitarily with the inner race of the rolling bearing B. Under the above-mentioned configuration, the moving means V can move forwards and backwards in a direction vertical to the surface as shown in FIG. 2 by means of the rolling bearing B supported rotatably against the wheel W. As shown in FIG. 2, a pinion P is located on the outer end periphery of the spline shaft 8, and the spline shaft 8 is pushed outward to allow the pinion P to engage with a rack R located in up and down directions (See a dash-dotted line of FIG. 2). If the spline shaft 8 rotates, the moving means V moves along the rack R in the up and down directions. As shown in FIG. 2, the spline shaft 8 can move in forward and backward directions, and as the pinion P located on the end periphery of the spline shaft 8 engages with the rack R, further, the spline shaft 8 can move in up and down directions.

When the spline shaft 8 in the ball spline 10 is pushed outward to thus cause the pinion P to move toward the rack R so as to perform the above-mentioned movements, however, the teeth of the pinion P are not located at the spaces between the teeth of the rack R, so that undesirably, the teeth of the pinion P collide against the teeth of the rack R and thus do not engage with the teeth of the rack R, thereby making the pinion P or the rack R broken.

DISCLOSURE

Technical Problem

Accordingly, the present invention has been made to solve the above-mentioned problems, and it is an object of the present invention to provide a ball spline with detour tracks that is configured to allow a nut to be rotatable in a given range with respect to a spline shaft through the detour tracks.

Technical Solution

To accomplish the above-mentioned objects, according to the present invention, there is provided a ball spline with detour tracks that is configured to have a bar-shaped spline shaft, a nut part movable along a longitudinal direction of the spline shaft in such a manner as to insert the spline shaft thereinto, and a plurality of balls circulatedly provided between the nut part and the spline shaft, wherein the nut part includes a nut as a cylindrical hollow body adapted to insert the spline shaft thereinto and retainers as hollow bodies located on both longitudinal sides of the nut in such a manner as to insert the spline shaft thereinto, the spline shaft includes one or more tracks concavely extended along the longitudinal direction thereof, the nut includes one or more load track grooves concavely formed in a longitudinal direction thereof on an inner peripheral surface as a hollow portion into which the spline shaft is inserted and one or more non-load circulating portions formed in the longitudinal direction thereof in parallel with the load track grooves, each retainer includes circulating grooves curvedly concaved on the inner peripheral surface thereof in such a manner as to allow one side to face the end periphery of the load track groove and to allow the other side to face the end periphery of the non-load circulating portion, the balls are changed in direction in the circulating grooves of both longitudinal side retainers, run between the tracks and the load track grooves, and circulatedly move along the non-load circulating portions, and each track includes a track groove formed in the longitudinal direction of the spline shaft and detour tracks whose both longitudinal sides are connected to the track groove.

According to the present invention, the detour tracks may include detour track grooves spaced apart from the track groove in parallel with the track groove and inclined track grooves inclinedly extended from both longitudinal sides of the detour track grooves in such a manner as to be connected to the track groove.

According to the present invention, the detour tracks are located on both circumferential sides of the spline shaft, while placing the track groove therebetween.

According to the present invention, the detour tracks are formed more deeply than the track groove, so that the balls have gaps between the detour tracks and the load track grooves.

According to the present invention, each retainer may include a cylindrical inner surface, and the circulating grooves are open to the inner surface.

According to the present invention, each load track groove faces the track groove and has expanded track portions on both longitudinal ends thereof.

According to the present invention, further, the ball spline may include a ball bush having one or more bush load track grooves concavely formed in the inner peripheral surface of the nut in the longitudinal direction of the nut, one or more bush non-load circulating portions formed on positions spaced apart from the bush load track grooves in the longitudinal direction of the nut, one or more bush circulating grooves curvedly concaved on the inner peripheral surface facing the nut in such a manner as to allow one side to face the bush load track grooves and to allow the other side to face the non-load circulating portions, and a plurality of balls changed in direction in the bush circulating grooves and circulatedly moving between the bush load track grooves and the outer peripheral surface of the spline shaft and along the bush non-load circulating portions.

Advantageous Effects

According to the present invention, the ball spline 100 with the detour tracks is configured to allow the nut 120 to be rotatable in a given range with respect to the spline shaft 110 through the detour tracks 111-1, thereby allowing the nut 120 to have a gap in the rotation direction thereof, preventing the inclined track grooves 111b-1 of the detour tracks 111-1 from being damaged by the contacts with the balls 150, and keeping the retainers 130 from being damaged by the interference with the spline shaft 110, so that the ball spline 100 according to the present invention can a high bending resistance.

MODE FOR INVENTION

Hereinafter, an explanation of a ball spline with detour tracks according to the present invention will now be described in detail with reference to the attached drawings.

Figure 3:
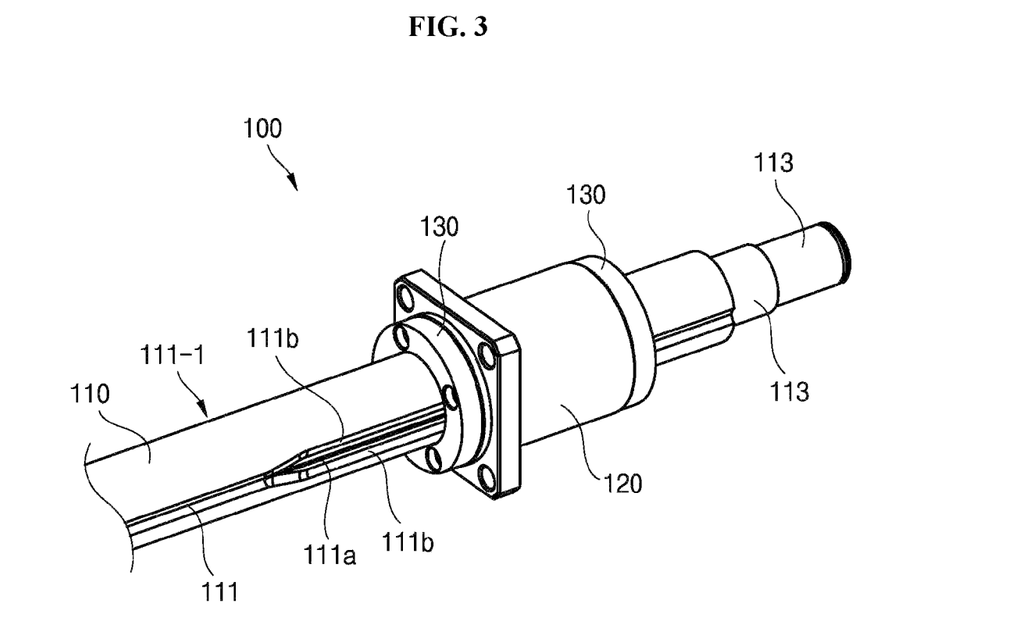
FIG. 3 is a perspective view showing a ball spline with detour tracks according to the present invention, in which some parts are omitted.
Figure 4:
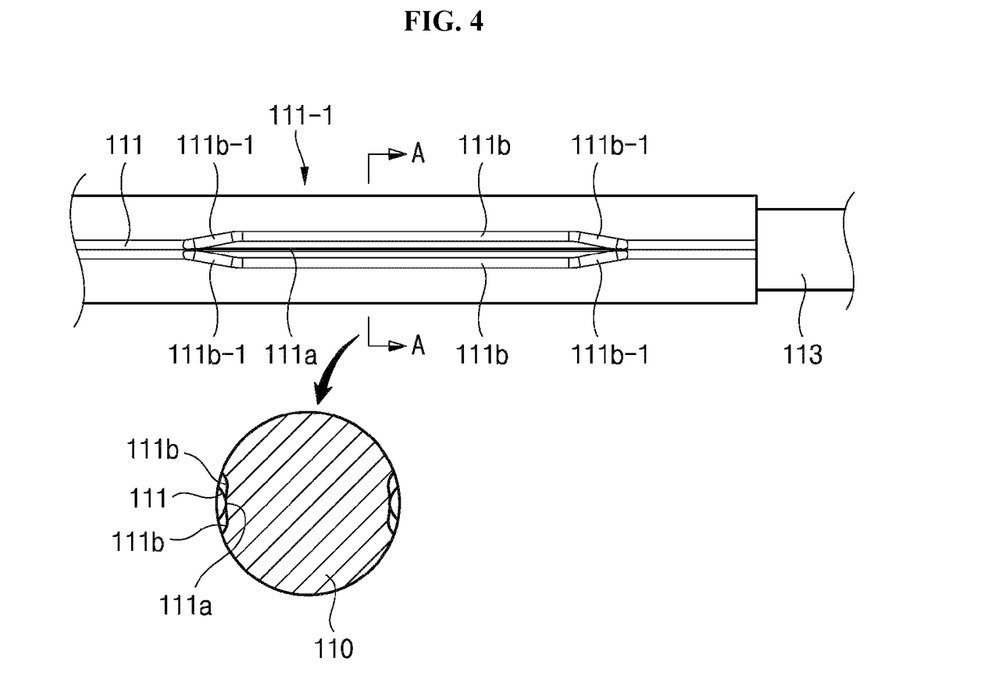
FIG. 4 is a sectional view showing a portion of a spline shaft of the ball spline with detour tracks according to the present invention.
Figure 5:
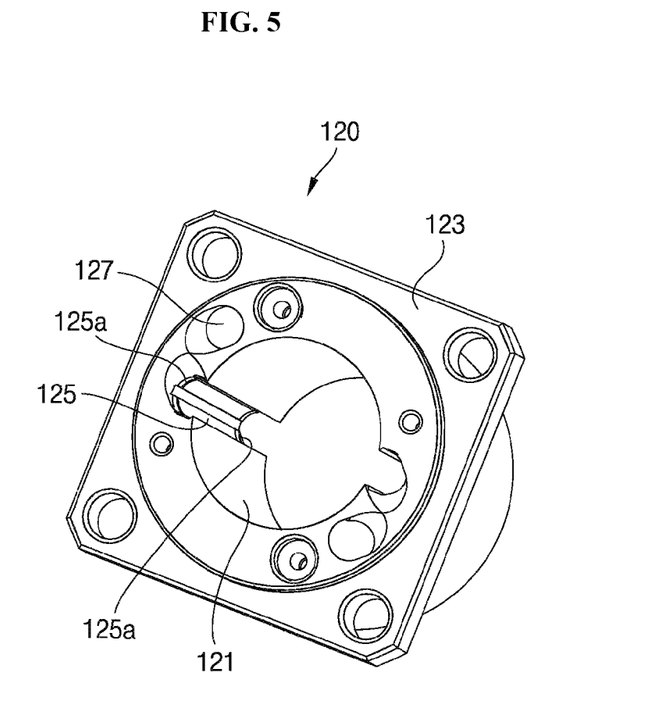
FIG. 5 is a perspective view showing a nut of the ball spline with detour tracks according to the present invention.
Figure 6:
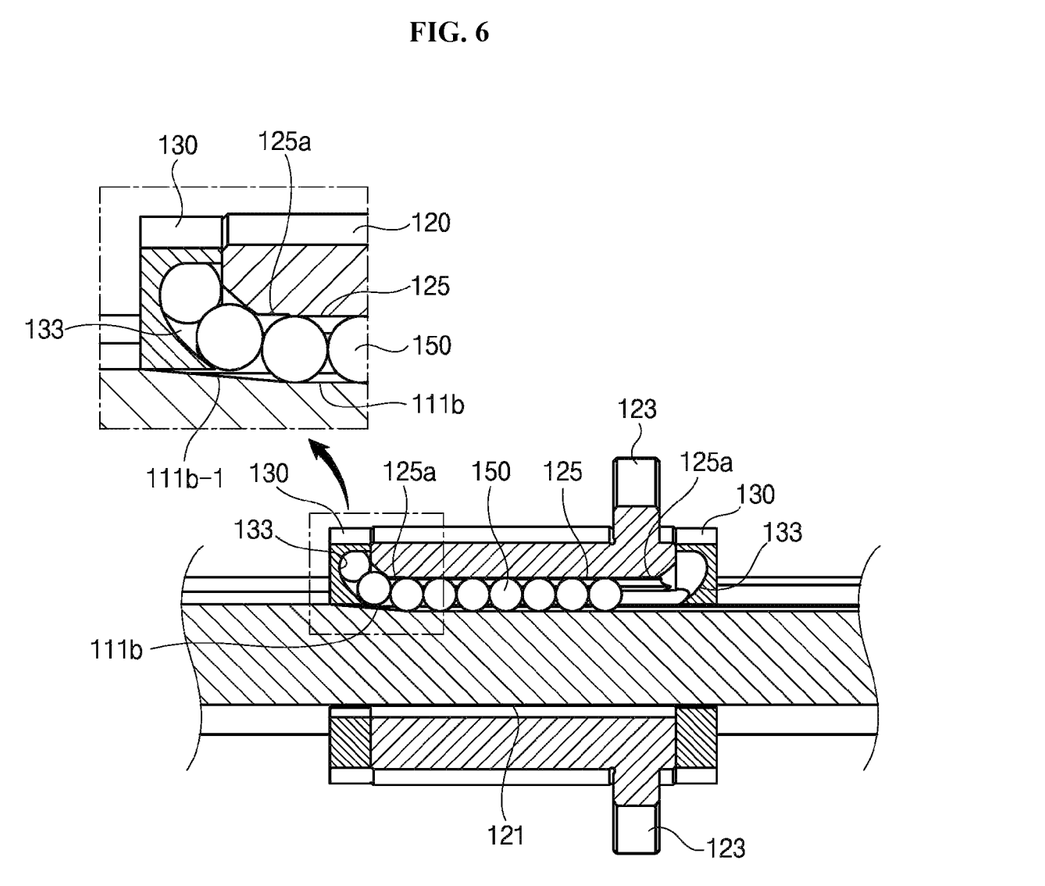
FIG. 6 is a sectional view showing a longitudinal portion of the ball spline with detour tracks according to the present invention.
Figure 7:
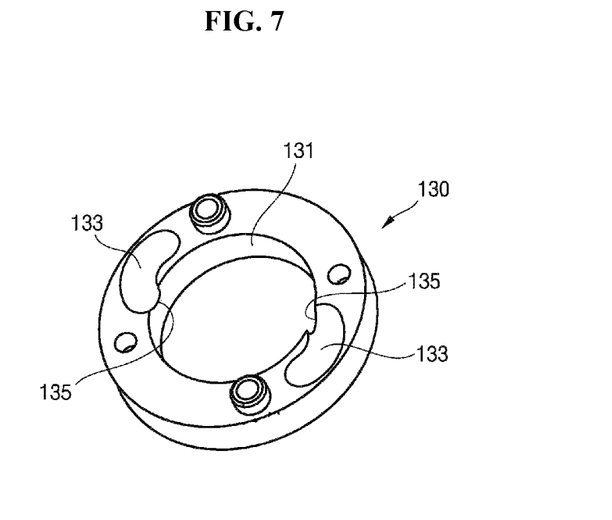
FIG. 7 is a perspective view showing a retainer of the ball spline with detour tracks according to the present invention.
Figure 8:
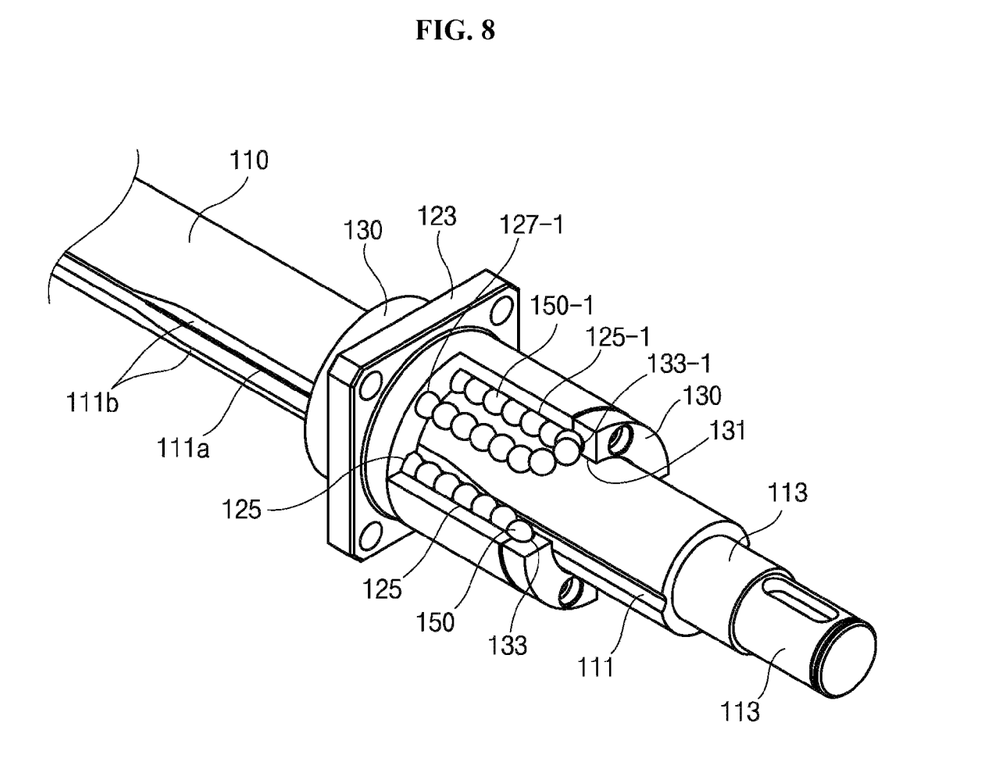
FIG. 8 is a partially cutaway perspective view showing a variation of the ball spline with detour tracks according to the present invention.

FIG. 3 is a perspective view showing a ball spline with detour tracks according to the present invention, in which some parts are omitted, FIG. 4 is a sectional view showing a portion of a spline shaft of the ball spline with detour tracks according to the present invention, FIG. 5 is a perspective view showing a nut of the ball spline with detour tracks according to the present invention, FIG. 6 is a sectional view showing a longitudinal portion of the ball spline with detour tracks according to the present invention, FIG. 7 is a perspective view showing a retainer of the ball spline with detour tracks according to the present invention, and FIG. 8 is a partially cutaway perspective view showing a variation of the ball spline with detour tracks according to the present invention.

As shown in FIGS. 3 and 5, a ball spline with detour tracks according to the present invention includes a bar-shaped spline shaft 110, a nut part movable along a longitudinal direction of the spline shaft 110 in such a manner as to insert the spline shaft 110 thereinto, and a plurality of balls 150 circulatedly provided between the nut part and the spline shaft 110.

The nut part includes a nut 120 as a cylindrical hollow body adapted to insert the spline shaft 110 thereinto and retainers 130 as hollow bodies located on both longitudinal sides of the nut 120 in such a manner as to insert the spline shaft 110 thereinto. The nut 120 is made of high carbon steel such as bearing steel. Each retainer 130 has a doughnut-like shape formed by removing the center of a disc-like shape. The retainers 130 are made of engineering plastic (Nylon 6, Nylon 66, or Nylon 6 and Nylon 66 containing glass fibers), but of course, they may be made of a metal such as bearing steel, like the nut 120. Even though not shown, further, seals as hollow bodies may be located between the nut 120 and one side retainer 130 and between the nut 120 and the other side retainer 130. As shown in FIG. 1, the retainers 130 are coupled to the nut 120 by means of bolts.

The spline shaft 110 has one or more tracks concavely extended along the longitudinal direction thereof. The spline shaft 110 with the bar-shaped circular section is made by concavely machining the tracks on the outer peripheral surface thereof. In this case, two tracks may be provided on positions opposite to each other, and otherwise, five tracks may be provided at intervals of 90°. The spline shaft 110 has a shaft mounting part 113 fitted to the end periphery thereof in such a manner as to become reduced in diameter. The shaft mounting part 113 has a key groove (not shown) formed thereon and a pinion disposed thereon.

The nut 120 includes a flange 123, one or more load track grooves 125 concavely formed in a longitudinal direction thereof on an inner peripheral surface 121 as a hollow portion into which the spline shaft 110 is inserted, and one or more non-load circulating portions 127 formed in the longitudinal direction thereof in parallel with the load track grooves 125. The number of load track grooves 125 and the number of non-load circulating portions 127 are the same as the number of tracks formed on the spline shaft 110. The non-load circulating portions 127 are through holes formed on the nut 120 in the longitudinal direction of the nut 120. The load track grooves 125 are formed on the positions facing the tracks.

Each retainer 130 has circulating grooves 133 curvedly concaved on the inner peripheral surface facing the nut 120. One or more circulating grooves 133 are formed. The number of circulating grooves 133 is the same as the number of tracks. One side of each circulating groove 133 faces the end periphery of the load track groove 125 corresponding thereto and the other side faces the end periphery of the non-load circulating portion 127 corresponding thereto.

The balls 150 are changed in direction in the circulating grooves 133 of both longitudinal side retainers 130, run between the tracks and the load track grooves 125, and circulatedly move along the non-load circulating portions 127. The technology for the circulation of the balls 150 is well known in the art, and for the brevity of the description, accordingly, an explanation of the circulation technology will be avoided.

Each track has a track groove 111 formed in the longitudinal direction of the spline shaft 110 and detour tracks 111-1 whose both longitudinal sides are connected to the track groove 111. If an external force in a rotation direction is applied to the nut 120 or the spline shaft 110, the balls 140 move along the spaces between the detour tracks 111-1 and the load track grooves 125, thereby allowing the nut 120 to rotate to a given angle with respect to the spline shaft 110.

The detour tracks 111-1 include detour track grooves 111*b* spaced apart from the track groove 111 in parallel with the track groove 111 and inclined track grooves 111*b*-1 inclinedly extended from both longitudinal sides of the detour track grooves 111*b* in such a manner as to be connected to the track groove 111. If the balls 150 run between the track grooves 111 and the load track grooves 125 and then move between the load track grooves 125 and the detour tracks 111-1, they move along one side inclined track grooves 111*b*-1, the detour track grooves 111*b*, the other side inclined track grooves 111*b*-1, and the track grooves 111.

Each ball 150 has 2-point contacts with the track groove 111 and 2-point contacts with the load track groove 125, so that it moves with 4-point contacts. The track groove 111 and the load track groove 125 have the shape of an arch with the radius of curvature greater than the radius of each ball 150, and accordingly, each of them can have 2-point contacts with each ball 150. This is the known technology in the conventional practices, and for the brevity of the description, therefore, an explanation of the balls 150 will be avoided.

As shown in FIG. 4, the detour tracks 111-1 are located on both circumferential sides of the spline shaft 110, while placing the track groove 111 therebetween. The detour tracks 111-1 are formed more deeply than the track groove 111, so that the balls 150 have gaps between the detour tracks 111-1 and the load track grooves 125. As the balls 150 have gaps between the detour tracks 111-1 and the load track grooves 125, the nut 120 can have a gap in the rotation direction with respect to the spline shaft 110, so that in the process of the rack and pinion engagement as shown in FIG. 2, the engagement can be gently performed.

A reference numeral 111*a* in FIGS. 2 and 3 represents the track groove 111 parallel with the detour track grooves 111*b*.

As shown in FIGS. 5 and 6, each load track groove 125 faces the track groove 111 and has expanded track portions 125*a* on both longitudinal ends thereof. If the balls 150 move to thus reach the expanded track portions 125*a*, gaps of the balls 150 between the expanded track portions 125*a* and the detour tracks 111-1 become large, and accordingly, the damages of the inclined track grooves 111*b*-1 caused by the balls 150 can be suppressed or prevented.

As shown in FIG. 7, each retainer 130 has a cylindrical inner surface 131, and the circulating grooves 133 are open to the inner surface 131, so that the circulating grooves 133 have inner peripheral openings 135 formed on the inner peripheries thereof in such a manner as to be open to the inner surface 131. Accordingly, the retainer 130 does not have any protruding components inwardly from the inner surface 131 thereof in the radius direction thereof, and the retainer 130 does not have any interference with the inclined track grooves 111*b*-1, while moving, so that the retainer 130 can be prevented from being broken by the occurrence of the interference with the inclined track grooves 111*b*-1.

As shown in FIG. 8, further, the ball spline with the detour tracks according to the present invention may include a ball bush. The tracks are formed on the spline shaft 110 at the positions facing each other, and the ball bush is located on the space between the tracks. As the ball bush is provided, the stiffness for the radius direction load applied to the nut 120 can be improved. The tracks are spaced apart from each other at an angle of 180°, and the ball bush is located on the space between both tracks.

The ball bush includes one or more bush load track grooves 125-1 concavely formed in the inner peripheral surface of the nut 120 in the longitudinal direction of the nut 120, one or more bush non-load circulating portions 127-1 formed on positions spaced apart from the bush load track grooves 125-1 in the longitudinal direction of the nut 120, one or more bush circulating grooves 133-1 curvedly concaved on the inner peripheral surface facing the nut 120 in such a manner as to allow one side to face the bush load track grooves 125-1 and allow the other side to face the non-load circulating portions 127-1, and a plurality of balls 150-1 changed in direction in the bush circulating grooves 133-1 and circulatedly moving between the bush load track grooves 125-1 and the outer peripheral surface of the spline shaft 110 and along the bush non-load circulating portions 127-1. The bush non-load circulating portions 127-1 are through holes formed in the longitudinal direction of the nut 120. The bush load track grooves 125-1 face the outer peripheral surface of the spline shaft 110 which has an arch-shaped section. The balls 150-1 move between the bush load track grooves 125-1 and the outer peripheral surface of the spline shaft 110 (having the arch-shaped section), are changed in direction in the bush circulating grooves 133-1, and are then guided to move along the bush non-load circulating portions 127-1, so that the balls 150-1 are endlessly circulated.

INDUSTRIAL APPLICABILITY

The ball spline 100 with the detour tracks according to the present invention can be applied to various applications.

The invention claimed is:

1. A ball spline with detour tracks, comprising:
a spline shaft;
a nut part surrounding the spline shaft and being movable along a longitudinal direction of the spline shaft; and
a plurality of balls provided between the nut part and the spline shaft,
wherein the nut part comprises:
a nut having a cylindrical hollow body to allow the spline shaft to be inserted thereinto, and
retainers surrounding the spline shaft and being in the form of hollow bodies located on both longitudinal sides of the nut,
the spline shaft comprises one or more tracks concavely extended along the longitudinal direction thereof,
wherein the nut comprises:
one or more load circulating portions having load track grooves concavely formed in a longitudinal direction of the nut on an inner peripheral surface of a hollow portion into which the spline shaft is inserted, and
one or more non-load circulating portions formed in the longitudinal direction of the nut in parallel with the load track grooves,
wherein each of the retainers comprises circulating grooves concaved on an inner peripheral surface thereof while being curved to allow one side to face an end of a respective one of the load track grooves and to allow the other side to face an end of a respective one of the non-load circulating portions so that each one of the circulating grooves connects one of the load track grooves to one of the non-loading circulating portions,
wherein the balls change direction in the circulating grooves of the retainers so that the balls circulate between the load circulating portions and the non-load circulating portions, wherein the balls run between the tracks of the spline shaft and the load track grooves of the load circulating portions, and
wherein each of the tracks of the spline shaft comprises;
a track groove formed in the longitudinal direction of the spline shaft, and
detour tracks including longitudinal sides that are both connected to the track groove.

2. The ball spline according to claim 1, wherein the detour tracks comprise:
detour track grooves spaced apart from the track groove in parallel with the track groove, and
inclined track grooves extending from the longitudinal sides of the detour track grooves towards the track groove and connecting to the track groove.

3. The ball spline according to claim 2, wherein the detour tracks have a depth that is greater than a depth of the track groove, and wherein the balls, when in the detour tracks, have gaps between the detour tracks and the load track grooves.

4. The ball spline according to claim 2, wherein each of the retainers comprises a cylindrical inner surface, and the circulating grooves are open to the inner surface.

5. The ball spline according to claim 2, wherein each one of the load track grooves faces the track groove and has expanded track portions on both longitudinal ends thereof.

6. The ball spline according to claim 2, further comprising a plurality of bush balls arranged to run on an outer peripheral surface of the spline shaft, except where the tracks are formed in the spline shaft.

7. The ball spline according to claim 6, wherein the nut part further comprises a ball bush,
wherein the ball bush comprises:
one or more bush load circulating portions having bush load track grooves concavely formed in the inner peripheral surface of the nut and extending in a longitudinal direction of the nut;
one or more bush non-load circulating portions formed in positions spaced apart from the bush load track grooves and extending in the longitudinal direction of the nut; and
one or more bush circulating grooves concaved on inner peripheral surfaces of each of the retainers facing the nut while being curved to allow one side of the bush circulating grooves to face the bush load track grooves and to allow another side of the bush circulating grooves to face the non-load circulating portions,
wherein the plurality of bush balls change direction in the bush circulating grooves so that the bush balls circulate between the bush load circulating portions and the bush non-load circulating portions, wherein the bush balls run between the bush load track grooves and the outer peripheral surface of the spline shaft in the bush load circulating portions.

8. The ball spline according to claim 2, wherein the detour tracks are formed alongside the track groove with the track groove placed therebetween.

9. The ball spline according to claim 8, wherein the detour tracks have a depth that is greater than a depth of the track groove, wherein the balls, when in the detour tracks, have gaps between the detour tracks and the load track grooves.

10. The ball spline according to claim 8, wherein each of the retainers comprises a cylindrical inner surface, and the circulating grooves are open to the inner surface.

11. The ball spline according to claim 8, wherein each one of the load track grooves faces the track groove and has expanded track portions on both longitudinal ends thereof.

12. The ball spline according to claim 8, further comprising a plurality of bush balls arranged to run on an outer peripheral surface of the spline shaft, except where the tracks are formed in the spline shaft.

13. The ball spline according to claim 12, wherein the nut part further comprises a ball bush,
wherein the ball bush comprises:
one or more bush load circulating portions having bush load track grooves concavely formed in the inner peripheral surface of the nut and extending in a longitudinal direction of the nut;
one or more bush non-load circulating portions formed in positions spaced apart from the bush load track grooves and extending in the longitudinal direction of the nut; and
one or more bush circulating grooves concaved on inner peripheral surfaces of each of the retainers facing the nut while being curved to allow one side of the bush circulating grooves to face the bush load track grooves and to allow another side of the bush circulating portions to face the non-load circulating portions,
wherein the plurality of bush balls change direction in the bush circulating grooves so that the bush balls circulate between the bush load circulating portions and the bush non-load circulating portions, wherein the bush balls run between the bush load track grooves and the outer peripheral surface of the spline shaft in the bush load circulating portions.

* * * * *